United States Patent [19]

Ishii

[11] 4,190,796
[45] Feb. 26, 1980

[54] PRESSURE DETECTING APPARATUS HAVING LINEAR OUTPUT CHARACTERISTIC

[75] Inventor: Akira Ishii, Machida, Japan

[73] Assignee: Tokyo Shibaura Electric Company, Limited, Tokyo, Japan

[21] Appl. No.: 909,109

[22] Filed: May 24, 1978

[30] Foreign Application Priority Data

Jun. 2, 1977 [JP] Japan .................................. 52-65099
Sep. 10, 1977 [JP] Japan .................................. 52-109130

[51] Int. Cl.² .............................................. G01L 9/06
[52] U.S. Cl. .................................... 323/75 N; 73/726
[58] Field of Search ......................... 323/75 H, 75 N; 324/62 R, DIG. 1; 73/719, 720, 725, 726

[56] References Cited

U.S. PATENT DOCUMENTS

| | | | |
|---|---|---|---|
| 3,111,620 | 11/1963 | Baker | 324/DIG. 1 |
| 3,406,331 | 10/1968 | Rose | 323/75 N |
| 3,688,581 | 9/1972 | Le Quernec | 323/75 H |
| 4,000,454 | 12/1976 | Brakl | 323/75 N |
| 4,068,166 | 1/1978 | Pichon | 323/75 N |

FOREIGN PATENT DOCUMENTS

| | | | |
|---|---|---|---|
| 50-159373 | 12/1975 | Japan | 323/75 N |
| 51-36589 | 11/1976 | Japan | 323/75 N |
| 51-131344 | 11/1976 | Japan | 323/75 N |
| 52-40184 | 3/1977 | Japan | 323/75 N |
| 1068917 | 5/1967 | United Kingdom | 324/DIG. 1 |

*Primary Examiner*—A. D. Pellinen
*Attorney, Agent, or Firm*—Oblon, Fisher, Spivak, McClelland & Maier

[57] ABSTRACT

A pressure detecting apparatus which comprises a bridge circuit with semiconductor pressure elements; a constant voltage circuit for applying voltage to the bridge circuit; an amplifier circuit for amplifying the output of the bridge circuit thereby to provide an electrical signal proportional to the pressure variation; and a voltage correcting circuit connected between the input of the amplifier circuit and the input of the bridge circuit for amplifying the output of the bridge circuit to feed it back to the bridge circuit, and in which the output of the voltage correcting circuit and the output of the constant voltage circuit are applied to the bridge circuit to improve the linearity of the response characteristic or the pressure-electrical signal output characteristic.

10 Claims, 5 Drawing Figures

PRESSURE DETECTING APPARATUS HAVING LINEAR OUTPUT CHARACTERISTIC

BACKGROUND OF THE INVENTION

This invention relates to pressure detecting apparatuses, and more particularly to an improved pressure detecting apparatus in which the linearity of the response characteristic is improved and temperature compensation is effected for the output voltage variation.

A pressure detecting apparatus is known in the art for measuring a fluid pressure comprising a bridge circuit having semiconductor pressure sensitive elements adapted to convert a pressure variation into an electrical signal on the basis of the piezo resistance effect and a reference resistor providing a constant resistance independent of temperature variation. A constant voltage is applied to the bridge circuit and the output of the bridge circuit is amplified and converted into a current or voltage signal, whereby an electrical signal corresponding to the pressure variation is obtained.

The pressure-resistance variation characteristic of the semiconductor pressure sensitive element itself is non-linear. Therefore, even if such a bridge circuit is formed to detect the pressure, the pressure-voltage characteristic, or the response characteristic, of the bridge circuit is non-linear.

This nonlinear response characteristic is due to the error of the pressure sensitive element. For instance, in the case where a measuring instrument such as a recorder having a linear type meter is connected at the rear stage, measurement errors are caused.

Accordingly in order that the pressure detection should not be affected by the error of the pressure sensitive element, only a part of the output characteristic of the pressure sensitive element, which is satisfactory in linearity, is employed, or the output of the bridge circuit is electrically corrected after being amplified. This is the conventional method of minimizing the effect of the error of the pressure sensitive element.

However, in the first means of the conventional method, only a linear part of the output characteristic is utilized as was described, and therefore the first means is disadvantageous in that the pressure detection range is reduced. On the other hand, in the second means the nonlinearity can be corrected by signal process only in a predetermined pressure detection range; however, the second means is also disadvantageous in that in a different pressure detection range the output variation width for the pressure detection range fluctuates thereby causing error even with the one and same pressure width. For this reason, in detecting a pressure in a different pressure range it is necessary to change the aforementioned electrically correcting circuit constant employed after amplification, which results in inconvenience in pressure detection.

Furthermore, adjustment of the linearity of the pressure-electricity characteristic is made at several points in a predetermined pressure detection range. Therefore, it is difficult to maintain the linearity over the entire predetermined pressure detection range. In addition, maintaining the linearity is more difficult when the pressure detection range is changed.

The pressure widths corresponding to certain output variation widths are not always coincident with one another. As a result, adjustment of the input to a measuring instrument connected at the rear stage becomes rather intricate, which leads to errors in measurement.

The output characteristic of the bridge circuit causes a pressure detection error depending on temperature variations because the semiconductor pressure sensitive element has a resistance-temperature coefficient. In order to overcome this difficulty, a thermistor having a negative resistance-temperature coefficient is inserted between the bridge circuit and the constant voltage source, so that the input voltage to the bridge circuit is changed in association with the temperature variation, to carry out thereby the temperature compensation.

However, in this conventional method, it is difficult to vary the input voltage in coincidence with the temperature-resistance characteristic of the bridge circuit, and the temperature compensation by the thermistor is applicable only to temperature variation in a very small range.

It may be considered to drive the bridge circuit by a constant current source instead of the constant voltage source. However, in this case a rather intricate circuit is required for the compensation of the nonlinearity. Accordingly, it is difficult to put such a circuit in practical use in view of stability and reliability.

SUMMARY OF THE INVENTION

Accordingly, an object of this invention is to provide a pressure detecting apparatus which has a substantially linear output characteristic in any pressure detection range.

Another object of the invention is to provide a pressure detecting apparatus which is capable of carrying out temperature compensation over a wide temperature variation range.

Still another object of the invention is to provide a pressure detecting apparatus in which even if the pressure detection range is changed, the variation width of an output for a pressure is substantially constant if the width of the pressure is maintained unchanged.

A further object of the invention is to provide a pressure detecting apparatus in which the pressure-electrical signal characteristic can be made linear entirely over a predetermined pressure detection range by adjusting an output electrical signal corresponding to a particular pressure.

A still further object of the invention is to provide a pressure detecting apparatus in which the amount of temperature compensation can be varied.

A yet further object of the invention is to provide a pressure detecting apparatus in which the effect to the output due to the fluctuation in resistance-temperature coefficient of a plurality of semiconductor pressure sensitive elements in a bridge circuit is eliminated.

The foregoing object and other objects of the invention have been achieved by the provision of a pressure detecting apparatus which, according to the invention, comprises a bridge circuit having semiconductor pressure sensitive elements, a constant voltage circuit for applying a constant voltage to the bridge circuit, an amplifier circuit for amplifying the output of the bridge circuit, and a voltage correcting circuit connected between the input of the amplifier circuit and the input of the bridge circuit for feeding the output of the bridge circuit back to the input of the bridge circuit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
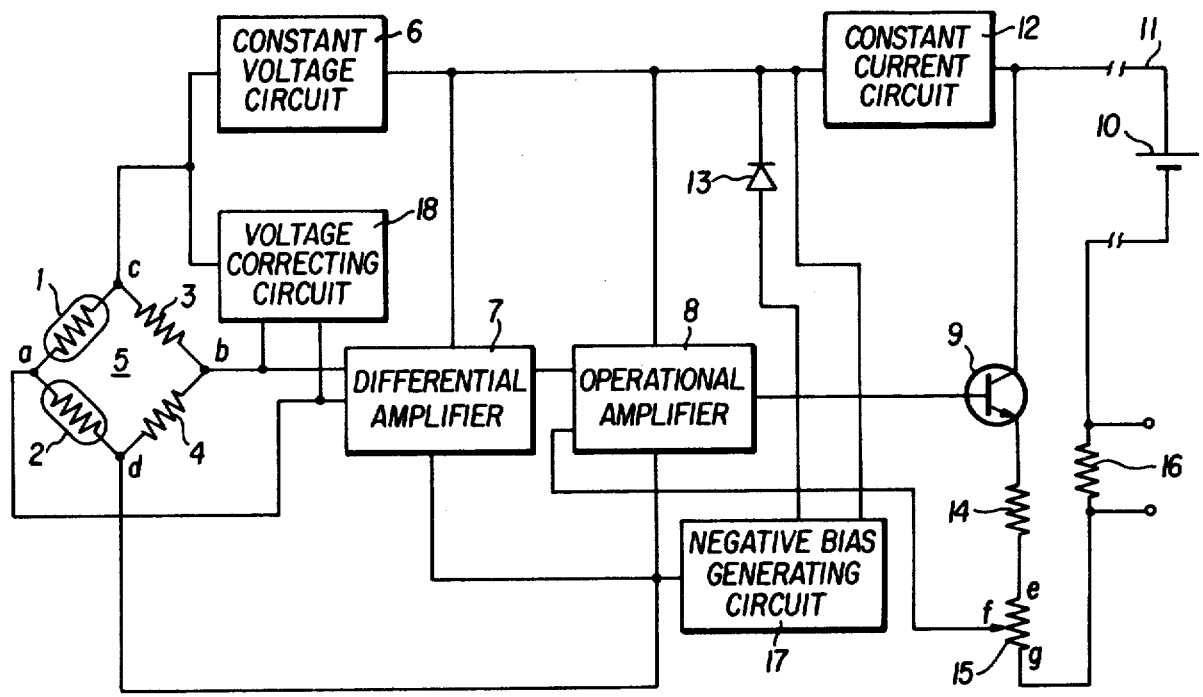
FIG. 1 is a block diagram for a description of the function of one embodiment of the invention.

Referring now to the drawings, wherein like reference numerals designate identical or corresponding parts throughout the several views, and more particularly to FIG. 1 thereof, in FIG. 1, reference numerals 1 and 2 designate semiconductor pressure-sensitive elements which utilize the piezo resistance effect of a semiconductor such as silicone or germanium as well known in the art. The semiconductor pressure sensitive elements 1 and 2 have resistances R1 and R2. In general, in measuring the pressure of an examined fluid, the fluid is received in a diaphragm so that a pressure is exerted on a different transmitting fluid through the diaphragm, and the pressure of the transmitting fluid is transmitted to the semiconductor pressure sensitive elements to distort the latter, the resultant distortions being converted into electrical signals, thereby to detect the pressure of the examined fluid.

These semiconductor pressure sensitive elements 1 and 2 are series-connected at the connection point a, while resistors 3 and 4 having resistances R3 and R4, respectively are series-connected at the connection point b. The series circuit of the pressure sensitive elements 1 and 2 and the series circuit of the resistors 3 and 4 are connected in parallel to each other at the connection points c and d to form a bridge circuit 5. An input voltage is applied between the points c and d of the bridge circuit 5, while an output voltage is developed between the points a and b. More specifically, a constant voltage from a constant voltage circuit 6 is applied between the points c and d, and the output voltage provided between the points a and b is applied to a known differential amplifier 7 which comprises a operational amplifier well known in the art.

The output of the bridge circuit 5 is applied to the differential amplifier 7 as was described above, and to a voltage correcting circuit 18, the output of which is fed back to the input terminal c of the bridge circuit 5. The voltage correcting circuit 18 is made up of an operational amplifier and has an amplification factor G as described later. That is, the circuit 18 operates to amplify the output of the bridge circuit 5 which is fed back to the input of the bridge circuit.

The voltage signal amplified by the differential amplifier 7 is applied to a known operational amplifier 8, the output of which is applied to the base of a transistor 9 operating as an amplifier. A voltage is applied to the collector of the transistor 9 through a line 11 by a power supply 10. In general, the power supply 10 is provided at a position remote from measuring points fluid, while the bridge circuit 5 and so forth are provided in the vicinity of measuring points for measuring the pressure of the latter.

The power supply 10 is connected through a conventional constant current circuit 12 to the constant voltage circuit 6, the differential amplifier 7 and the operational amplifier 8. The constant current circuit 12 operates to apply the current from the power supply 10 to the concerned sections while maintaining the current to the concerned sections unchanged. That is, the constant current circuit 12 is provided to maintain the operating points of the sections unchanged. The emitter of the transistor 9 is connected to a bias resistor 14. A current proportional to the current applied to the base of the transistor 9 is allowed to flow from the collector of the transistor 9 to the emitter and furthermore flow through the bias resistor 14, a span adjusting resistor 15, an output confirming resistor 16 and the line 11 to the power supply 10. The span adjusting resistor 15 is a variable resistor, in which the resistances between terminals e and f and between f and g can be varied by shifting the terminal f which is connected to one input of the operational amplifier. Accordingly, as the output voltage of the differential amplifier 7 is changed, the base current of the transistor 9 changes so that the feedback voltage from the terminal f is equal to the output voltage of the amplifier 7. As a result, the current flowing between the collector and emitter of the transistor 9, namely, the output current of the latter is changed. Thus, the amplifier 8 and the transistor 9 form a voltage-current converter.

A negative bias generating circuit 17 is connected to the differential amplifier 7 and the operational amplifier 8. The negative bias generating circuit 17 is a conventional circuit, which operates to generate a negative bias voltage with the aid of a current applied thereto from the constant current circuit 12. The negative bias generating circuit 17 is connected through a constant voltage diode 13 to the constant current circuit 12. That is, the constant voltage diode 13 is employed as a base for generating a reference voltage. The negative bias generating circuit 17 is provided for generating the reference voltage. However, this circuit 17 may be omitted if the input line, on the low voltage side, of the bridge circuit 5, that is, the line connecting the input terminal d to the power supply 10 is employed.

Figure 2:
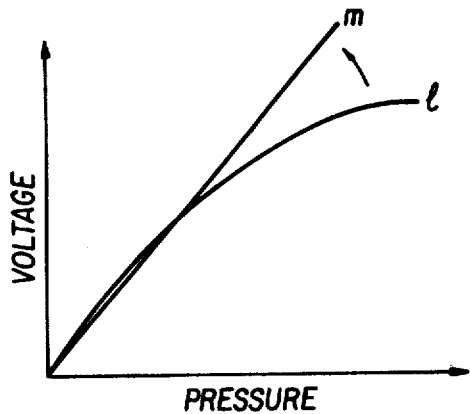
FIG. 2 is a graphical representation indicating the output pressure-voltage characteristic of a pressure detecting apparatus.

As the voltage correcting circuit 18 amplifies the input applied to the differential amplifier 7, it can correct the output characteristic of the bridge circuit 5, that is, the voltage-current characteristic, as shown in FIG. 2. In FIG. 2, the curve l indicates a conventional pressure vs. voltage characteristic, while the curve m indicates a pressure vs. voltage characteristic corrected. The arrow is intended to indicate the fact that the nonlinearity of the curve has been corrected.

Accordingly, if the amplification factor G of the voltage correcting circuit is obtained, and the output of this circuit is applied to the input terminal c of the bridge circuit 5, then the relation between the output voltage of the bridge circuit 5 and the detected voltage is substantially linear over the entire pressure detection range. In addition, even if the pressure detection range is changed, the range of variation of the output with respect to the pressure can be made substantially constant. That is, even if the pressure-resistance output characteristics of the semiconductor pressure sensitive elements 1 and 2 suffer from nonlinearity, a satisfactory linear characteristic can be obtained for the output, because it is fed back to the bridge circuit 5 by means of the voltage correcting circuit 18 before it is applied to the differential amplifier 7.

Furthermore, if in the predetermined pressure detection range the output characteristic linearity is checked at several points, the linearity can be maintained over the entire pressure detection range. In addition, the measurement of a different pressure detection range the linearity can be satisfactorily maintained.

Figure 3:
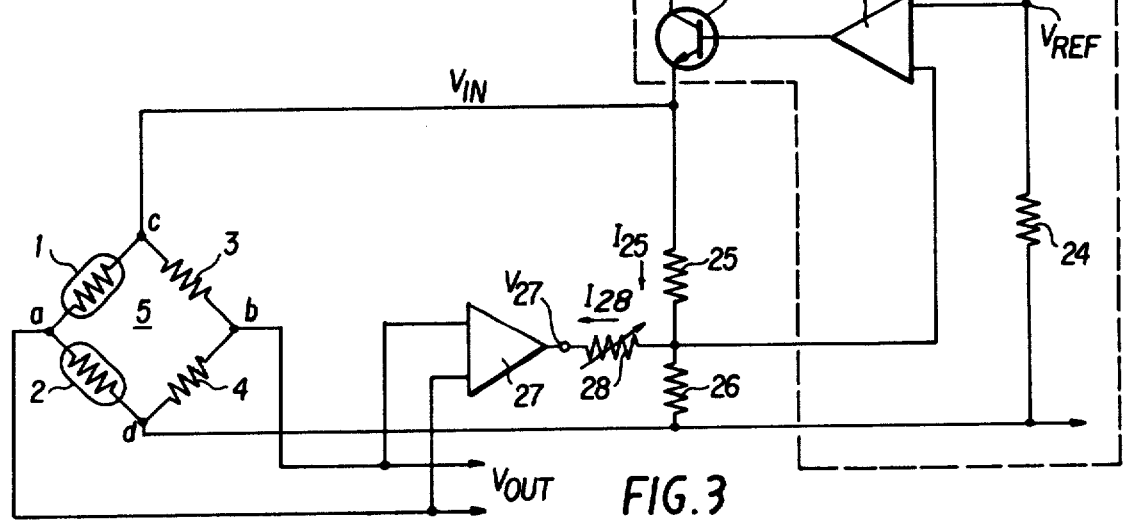
FIG. 3 and FIG. 4 are circuit diagram showing embodiments of a constant voltage circuit and a voltage correcting circuit differential amplifier.

As conducive to a full understanding of this invention, an embodiment of the invention shown in FIG. 3 will be described. In FIG. 3, a section surrounded by a broken line 20 is the constant voltage circuit 6 indicated in FIG. 1, whose ground line is connected to the input terminal d of the bridge circuit 5. Since FIG. 1 is a block diagram for a description of the function of the circuitry, the relationship between the constant voltage circuit 6 and the voltage correcting circuit 18 is as follows: In FIG. 3, the bridge circuit is identical to that shown in FIG. 1, and therefore it is designated by the same reference number as that in FIG. 1. The constant voltage circuit 20 has an operational amplifier 21, in which two inputs applied thereto are subjected to comparison, and the difference between the two inputs is applied, as an output, to a transistor 22. The constant current circuit 12 is connected through a constant current circuit, such as a constant current diode 23, to one input terminal of the amplifier 21, which input terminal is connected through a resistance element 24 to the terminal d of the bridge circuit 5, that is, the negative polarity side of the power supply 10. The resistance element 24 is provided for generating the reference voltage, while the constant current diode 23 is provided for supplying a constant current to the resistance element 24. The collector of the transistor 22 is connected to the constant current circuit 12, and the output of the operational amplifier 21 is applied to the base of the transistor 22. The emitter of the transistor 22 is connected to the input terminal c of the bridge circuit 5 to apply a voltage $V_{IN}$ to the bridge circuit 5. The emitter of the transistor 22 and the terminal d of the bridge circuit 5 are connected through resistors 25 and 26 to each other. The connection point of the resistors 25 and 26 is connected to the other input terminal of the operational amplifier 21.

The division voltage input of the resistors 25 and 26 is compared with the reference voltage provided by the resistance element 24 in the amplifier 21, whereby the transistor 22 is driven and the voltage $V_{IN}$ is outputted through the emitter of the transistor 22.

The voltage correcting circuit 18 is made up of an operational amplifier 27 and a variable resistor 28 whose one terminal is connected to the output of the operational amplifier 27. The other terminal is connected to the connection points of the resistors 25 and 26 which are connected in series to each other.

It is assumed that the resistances R1 and R2 of the resistors 1 and 2 in the bridge circuit 5 are represented by the following equations, respectively:

$$R1 = R0 - \Delta R$$

$$R2 = R0 + \Delta R$$

where R0 is the resistance obtained when no pressure is applied to the pressure element, and $\Delta R$ is the resistance variation obtained when a pressure is applied thereto.

Then, the output voltage Vout between the terminals a and b of the bridge circuit 5 is:

$$V_{out} = \left(\frac{R2}{R1+R2}\right)V_{IN} - \left(\frac{R4}{R3+R4}\right)V_{IN}$$

This output voltage Vout is applied to the differential amplifier 7, and also to the operational amplifier 27. If R3=R4, then $$V_{out} = \left[\frac{(R2-R1)}{2(R1+R2)}\right]V_{IN} = \left(\frac{\Delta R}{2R0}\right)V_{IN}$$

Therefore, $V_{IN} = (2R0/\Delta R)V_{out}$     (1)

or, $V_{IN} = V_{REF} + (I25)(R25)$     (2)

where $V_{REF}$ is the reference voltage across the resistance element 24, I25 is the current flowing in the resistor 25, and R25 is the resistance of the resistor 25.

The current I25 is the sum of a current I250 which flows in the resistor 25 when no pressure is applied to the pressure sensitive elements ($\Delta R=0$), and a current I28 flowing in the resistor 28. Therefore, $$I28 = I250 + I28 \quad (3)$$

If an input voltage to the bridge circuit 5 obtained when no pressure is applied to the pressure sensitive elements is represented by $V_{INO}$, then $$V_{INO} = V_{REF} + (I250)(R25) \quad (4)$$

From Equations (3) and (4), Equation (2) can be rewritten as follows:

$$V_{IN} = V_{INO} + (I28)(R25) \quad (5)$$

The current I28 flowing in the variable resistor 28 can be expressed as follows:

$$I28 = \frac{V_{REF} - V27}{R28}$$

where V27 is the output of the operational amplifier 27, and R28 is the resistance of the resistor 28.

If in the case of no pressure application, adjustment is made so that $V27 = V_{REF}$, then $V27 = V_{REF} - (1+G)$ Vout, where G is the amplification factor of the amplifier 27.

$$\text{Therefore, } I28 = \frac{(1+G)V_{out}}{R28} \quad (6)$$

Then, Equation (5) can be rewritten as follows:

$$V_{IN} = V_{INO} + \left[\frac{(1+G)R25}{R28}\right]V_{out} \quad (7)$$

Based on Equation (7), Equation (2) can be expressed as follows:

$$\left(\frac{2R0}{\Delta R}\right)V_{out} = V_{INO} + \left[\frac{(1+G)R25}{R28}\right]V_{out}$$

If $K = \frac{(1+G)R25}{R28}$, then $V_{out} = \left[\dfrac{1}{\dfrac{2RO}{\Delta R} - K}\right] V_{INO} =$ $\left[\dfrac{\dfrac{\Delta R}{2RO}(1 + \dfrac{K\Delta R}{2RO})}{1 - \dfrac{\Delta K^2}{4RO^2}K^2}\right] V_{INO}$ In this equation, $(\Delta R/R)^2$ is substantially zero (0), and therefore $V_{out} \simeq \dfrac{\Delta R}{2RO}(1 + \dfrac{K\Delta R}{2RO}) V_{INO}$ According to experiment, $\Delta R$ can be approximated in a quadratic function; that is, $\Delta R = AP^2 + BP + C$ (where A, B and C are the constants). A is close to 0 (zero). Therefore, the approximation is $\Delta R^2 = (BP+C)^2$.

Therefore, $V_{out} =$ $\dfrac{1}{2RO}\left[AP^2 + BP + C + \dfrac{K(BP+C)^2}{2RO}\right] V_{INO}.$ Accordingly, if the amplification factor of the amplifier 27 is adjusted so that $K = -(2RO/B^2)A$, a substantially linear pressure-voltage characteristic is obtained for the bridge circuit 5.

Thus, in the case of the embodiment shown in FIG. 3, the output characteristic can be made linear over the entire pressure detection range. Therefore, even if a different pressure detection range is measured with the same pressure variation width, a coincident output characteristic is obtained. Since the output characteristic is linear as was described, linearity can be maintained over the entire pressure detection range by checking several points thereof. A constant pressure variation width is obtained for a constant pressure variation width, and therefore detection can be achieved with a measuring instrument with accuracy, which is connected at the rear stage. Linearity between the pressure to be measured and the output electrical signal provides the advantage that despite the use of indicating instruments having a single scale (or graduation), a change of full scale value thereof can be made. Thus the error in reading the instruments can be easily reduced by employing a multiple full scale arrangement.

Figure 4:
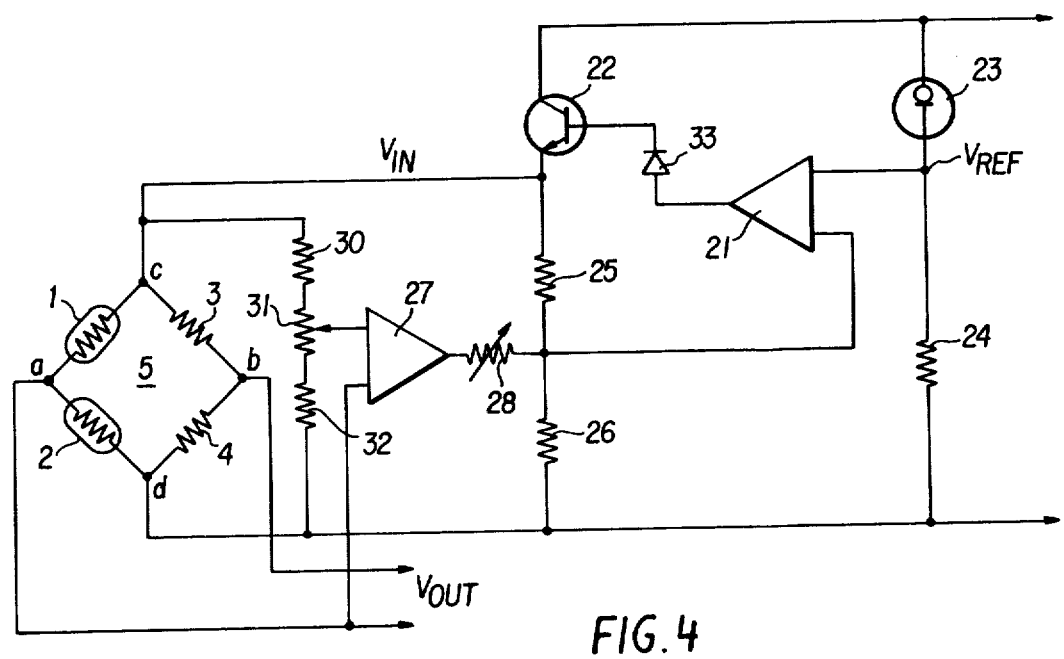

Shown in FIG. 4 is another embodiment of this invention, in which one input of the operational amplifier in the voltage correcting circuit is obtained from a different resistance type voltage divider circuit. In FIG. 4, those components which have been previously described with reference to FIG. 3 have been similarly numbered. The resistance-type voltage divider circuit is made up of a resistor 30, a variable resistor 31 and a resistor 32 which are connected in series, and the two end terminals of the voltage divider circuit are connected to the terminals c and d of the bridge circuit 5. One input of the amplifier 27 is obtained through the variable resistor 31. Reference numeral 33 designates a diode.

The operation of the circuitry shown in FIG. 4 is similar to that of the circuitry shown in FIG. 3. However, it should be noted that since the input of the operational amplifier 27 is obtained through the resistance-type voltage divider circuit, the non-coincidence between the resistances of the semiconductor pressure sensitive elements can be corrected, that is, the fluctuation in value of the semiconductor pressure sensitive element can be corrected.

Figure 5:
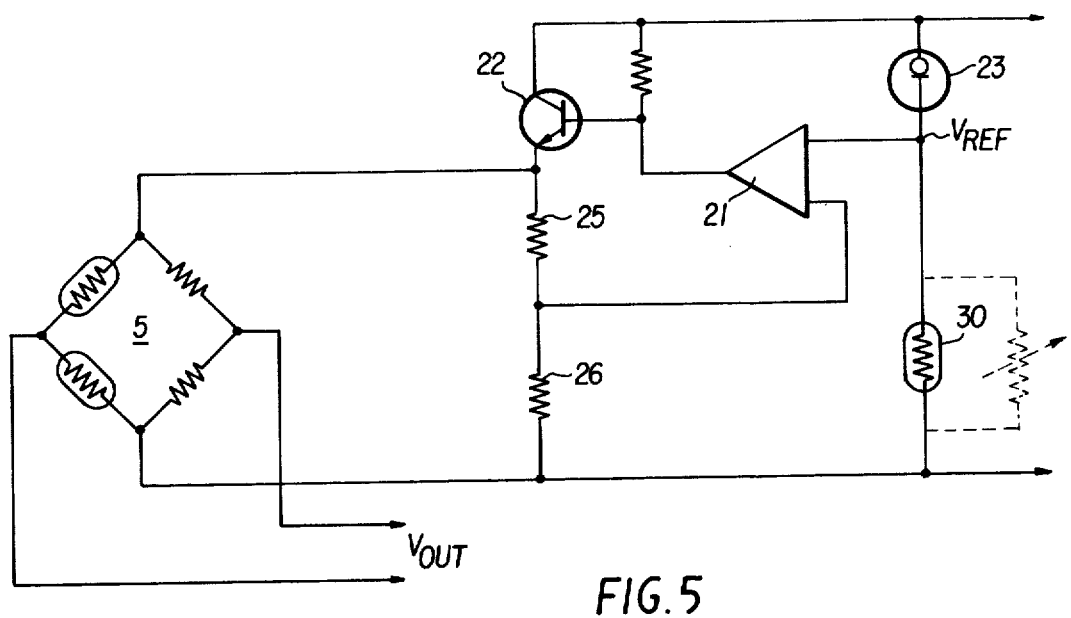
FIG. 5 is a circuit diagram showing one modification of a constant voltage circuit.

FIG. 5 shows one example of a constant voltage circuit which is obtained by replacing the resistance element 24 shown in FIGS. 3 and 4 by a resistance element having a resistance-temperature coefficient equal to or higher than the resistance-temperature coefficient of the semiconductor pressure sensitive element. In the circuitry shown in FIG. 5, the voltage correcting circuit has been omitted from the drawing for the purpose of simplicity, and those components which have been previously described with reference to FIG. 3 are designated by similar reference characters.

The resistances R1 and R2 of the semiconductor pressure sensitive elements 1 and 2 can be expressed as follows when the temperature variation components thereof are taken into consideration:

$R1 = R10(1+\alpha 1) - \Delta R10(1+\beta_1 t)$ $R2 = R20(1+\alpha 2) + \Delta R20(1+\beta_2 t)$ where R10 and R20 are the resistances at a temperature of 0° C. and at a pressure of zero, R10 and R20 are the resistances which vary upon application of a pressure at a temperature of 0° C., and $\alpha 1$, $\alpha 2$, $\beta 1$ and $\beta 2$ are the resistance-temperature coefficients thereof.

If $\alpha 1 = \alpha 2 = \alpha$, $\beta 1 = \beta 2 = \beta$, and $\Delta R10 = \Delta R20 = \Delta R$, then $V_{out} =$ $\left[\dfrac{R20(1+\alpha t) + 2\Delta R(1+\beta t) - R10(1+\alpha t)}{2(R10+R20)(1+\alpha t)}\right] V_{IN}$ $= \left[\dfrac{(R20-R10)(1+\alpha t) + 2\Delta R(1+\beta t)}{2(R10+R20)(1+\alpha t)}\right] V_{IN}$ And if the pressure is changed from 0 (zero) to $\Delta R$, that is, from $\Delta R = 0$ to $\Delta R = \Delta R$, then $\Delta V_o = V_{out}(\Delta R = \Delta R) - V_{out}(\Delta R = 0) =$ $\left[\dfrac{2\Delta R(1+\beta t)}{2(R10+R20)(1+\alpha t)}\right] V_{IN}$ $= \left[\dfrac{\Delta R(1+\beta T)}{(R10+R20)(1+\alpha t)}\right] V_{IN}$ This equation indicates a temperature effect in an output voltage variation corresponding to a pressure variation.

In general, $\beta$ is a negative temperature coefficient, but it can be made to be substantially zero by suitably manufacturing the pressure sensitive element. However, $\alpha$ is the value which is determined by the material of the semiconductor pressure sensitive element. Therefore, it can be understood that if the temperature becomes higher than that in this equation, the output voltage is decreased.

Accordingly, in this embodiment, the input voltage to the bridge circuit is varied in accordance with the temperature so that the output voltage is not affected by the temperature. For this purpose, in the embodiment, the temperature coefficient of the resistance element 30 providing the reference voltage is set to $(1+\alpha t)/(1+\beta t)$.

If it is assumed that the reference voltage provided by the resistance element 30 is represented by $V_{REF}$ and the resistance of the resistor 26 is represented by R26, then the following relation can be obtained:

$$V_{IN} = \left[ \frac{R25 + R26}{R26} \right] V_{REF}$$

Therefore, $\Delta V_o =$ $$\left[ \frac{\Delta R}{(R10 + R20)} \right] \left[ \frac{R25 + R26}{R26} \right] \left[ \frac{1 + \beta t}{1 + \alpha t} \right] V_{REF}$$

Thus, the temperature compensation can be effected if the resistance element 30 has the temperature coefficient $(1+\alpha t)/(1+\beta t)$.

The resistance temperature coefficients $\alpha$ and $\beta$ may be not always equal to those of the semiconductor pressure sensitive elements. Since $\beta$ is, in general, close to zero (0), all that is necessary is that $\alpha$ is substantially equal to that of the pressure sensitive element, and especially in the case when $\beta<0$ is significant, the resistance temperature coefficient can be made higher than that of the pressure sensitive element.

Silicon single crystal is employed as the material of the semiconductor pressure sensitive element, the resistance-temperature coefficient of which is of the order of 2000-2500 ppm. Therefore, metallic materials such as NI and Cu having a relatively linear temperature-resistance characteristic may be employed as the material of the pressure sensitive element. In this case, even if $\beta<0$, a satisfactory temperature compensation can be obtained over a wide temperature variation range. Furthermore, the output voltage variation is not affected by the temperature.

In addition, if a variable resistor (shown in dotted line in FIG. 5.) is connected in parallel to the resistance element 30 to vary the amount of temperature compensation, the temperature compensation can be considerably improved. In this case, the variable resistor may be one whose resistance-temperature coefficient is low.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pressure detecting apparatus comprising:
a bridge circuit having semiconductor pressure sensitive elements;
means for supplying a constant voltage to said bridge circuit wherein said constant voltage supplying means includes a voltage controlling amplifier having a reference voltage input, and a resistance element connected to the reference voltage input of the voltage controlling amplifier, the resistance-temperature coefficient of the resistance element being equal to or higher than those of the semiconductor pressure sensitive elements in said bridge circuit;
an amplifier for amplifying the output of said bridge circuit; and
a voltage correcting means connected between the input of said amplifier and the input of said bridge circuit for feeding the output of said bridge circuit back to the input of said bridge circuit.

2. The apparatus recited in claim 1, including:
a variable resistor circuit connected between both terminals of said resistance element.

3. A pressure detecting apparatus comprising:
a bridge circuit having semiconductor pressure sensitive elements;
means for supplying a constant voltage to said bridge circuit;
an amplifier for amplifying the output of said bridge circuit;
a voltage correcting means connected between the input of said amplifier and the input of said bridge circuit for feeding the output of said bridge circuit back to the input of said bridge circuit; and
a first voltage division resistance circuit connected to the input terminals of said bridge circuit and having an output terminal connected to said voltage correcting means.

4. The apparatus recited in claim 3, wherein:
said voltage supplying means includes a voltage controlling amplifier having a reference voltage input, and a resistance element connected to the reference voltage input of the voltage controlling amplifier, the resistance-temperature coefficient of the resistance element being equal to or higher than those of the semiconductor pressure sensitive elements in said bridge circuit.

5. The apparatus recited in claim 4, including:
a variable resistor circuit connected between both terminals of said resistance element.

6. The apparatus recited in claim 3 wherein said voltage correcting means includes:
an operational amplifier, and a variable resistor circuit connected to the operational amplifier for varying the output of said operational amplifier.

7. The apparatus recited in claim 3, wherein said constant voltage supplying means includes:
a voltage controlling amplifier having two inputs;
a resistance element connected to one input of the amplifier for providing a reference input voltage, and
a second voltage division resistance circuit connected to the input terminals of said bridge circuit and having a terminal connected to the other input of the voltage controlling amplifier and to the output of said voltage correcting circuit.

8. The apparatus recited in claim 7, wherein:
said resistance element has a resistance-temperature coefficient equal to or higher than those of said semiconductor pressure sensitive elements.

9. The apparatus recited in claim 8, including:
a variable resistor circuit connected between both terminals of said resistance element.

10. A pressure detecting apparatus comprising:
a bridge circuit having semiconductor pressure sensitive elements;
means for supplying a constant voltage to said bridge circuit;
an amplifier for amplifying the output of said bridge circuit; and
a voltage correcting means connected between the input of said amplifier and the input of said bridge circuit for feeding the output of said bridge circuit back to the input of said bridge circuit;
said constant voltage supplying means including
a voltage controlling amplifier having two inputs;
a resistance element connected to one input of the voltage controlling amplifier for providing a reference input voltage; and
a second voltage division resistance circuit connected to the input terminals of said bridge circuit and having a terminal connected to the other input of said voltage controlling amplifier and to the output of said voltage correcting means.

* * * * *